(12) United States Patent
VerSteeg et al.

(10) Patent No.: US 8,776,160 B2
(45) Date of Patent: Jul. 8, 2014

(54) SYSTEMS AND METHODS OF DIFFERENTIATED REQUESTS FOR NETWORK ACCESS

(76) Inventors: William C. VerSteeg, Alpharetta, GA (US); John M. Schlarb, Duluth, GA (US); Guy Atkinson Meador, III, Suwanee, GA (US)

( * ) Notice: Subject to any disclaimer, the term of this patent is extended or adjusted under 35 U.S.C. 154(b) by 407 days.

(21) Appl. No.: 11/829,274

(22) Filed: Jul. 27, 2007

(65) Prior Publication Data

US 2009/0031342 A1 Jan. 29, 2009

(51) Int. Cl.
*H04N 7/173* (2011.01)

(52) U.S. Cl.
USPC .......................................... 725/118; 725/121

(58) Field of Classification Search
None
See application file for complete search history.

(56) References Cited

U.S. PATENT DOCUMENTS

| | | | |
|---|---|---|---|
| 5,572,347 A | 11/1996 | Burton et al. ................. | 359/124 |
| 5,594,509 A | 1/1997 | Florin et al. | |
| 5,600,663 A | 2/1997 | Ayanoglu et al. ............... | 371/41 |
| 5,633,683 A | 5/1997 | Rosengren et al. | |
| 5,687,167 A | 11/1997 | Bertin et al. ................... | 370/254 |
| 5,699,365 A | 12/1997 | Klayman et al. ............... | 371/55 |
| 5,699,369 A | 12/1997 | Guha ............................. | 371/41 |
| 5,790,546 A | 8/1998 | Dobbins et al. | |
| 5,793,436 A | 8/1998 | Kim .............................. | 348/497 |
| 5,808,662 A | 9/1998 | Kinney et al. .................. | 348/15 |
| 5,815,145 A | 9/1998 | Matthews ...................... | 345/327 |
| 5,870,087 A | 2/1999 | Chau ............................. | 715/202 |
| 5,913,031 A | 6/1999 | Blanchard | |
| 5,943,047 A | 8/1999 | Suzuki | |
| 5,949,795 A | 9/1999 | Moroney et al. | |
| 6,016,166 A | 1/2000 | Huang et al. ................... | 348/515 |
| 6,072,804 A * | 6/2000 | Beyers, Jr. ..................... | 370/450 |
| 6,101,221 A | 8/2000 | Varanasi et al. ............... | 375/240 |
| 6,118,498 A | 9/2000 | Reitmeier | |

(Continued)

FOREIGN PATENT DOCUMENTS

| | | |
|---|---|---|
| EP | 0 714 192 | 5/1996 |
| EP | 1294193 | 3/2003 |

(Continued)

OTHER PUBLICATIONS

U.S. Appl. No. 10/080,380, filed Feb. 21, 2002, Entitled "Systems and Methods for Generating a Real-Time Video Program Guide Through Video Access of Multiple Channels," Inventor: Peter Chan.

(Continued)

*Primary Examiner* — Brian T Pendleton
*Assistant Examiner* — Jason K Lin
(74) *Attorney, Agent, or Firm* — Merchant & Gould P.C.

(57) ABSTRACT

Methods and systems of handling channel changes in a digital home communication terminal are disclosed. An exemplary method comprises: receiving a request for access to a downstream network connected to the DHCT; determining a source of the request for access; and setting at least one parameter to a value based on the determined source; and performing a channel change using the at least one parameter having the set value An exemplary system comprises: a channel acquisition component, memory, and a processor. The processor is programmed by code, stored in memory, to: receive a channel change request; determine whether the channel change request is user-initiated; and instruct the channel acquisition component to perform a channel change using at least one parameter. The parameter has a value that is based on the determination.

20 Claims, 7 Drawing Sheets

(56) References Cited

U.S. PATENT DOCUMENTS

| | | | |
|---|---|---|---|
| 6,119,092 A | 9/2000 | Patwardhan et al. | 704/503 |
| 6,173,115 B1 | 1/2001 | Willis | 386/125 |
| 6,252,849 B1 | 6/2001 | Rom et al. | |
| 6,278,716 B1 | 8/2001 | Rubenstein et al. | 370/432 |
| 6,307,839 B1 | 10/2001 | Gerszberg et al. | 370/235 |
| 6,310,918 B1 | 10/2001 | Saha et al. | 375/240.16 |
| 6,453,471 B1 | 9/2002 | Klosterman | |
| 6,480,541 B1 | 11/2002 | Girod et al. | 375/240.12 |
| 6,510,553 B1 | 1/2003 | Hazra | 725/87 |
| 6,538,992 B1 | 3/2003 | Subbiah et al. | 370/230 |
| 6,594,798 B1 | 7/2003 | Chou et al. | 370/389 |
| 6,628,301 B1 | 9/2003 | Colin et al. | |
| 6,665,751 B1 | 12/2003 | Chen et al. | 710/52 |
| 6,678,332 B1 | 1/2004 | Gardere et al. | 375/240.26 |
| 6,701,528 B1 | 3/2004 | Arsenault et al. | 725/89 |
| 6,728,965 B1 | 4/2004 | Mao | |
| 6,763,019 B2 | 7/2004 | Mehta et al. | 725/88 |
| 6,792,047 B1 | 9/2004 | Bixby et al. | 375/240.26 |
| 6,871,006 B1 | 3/2005 | Oguz et al. | 386/68 |
| 6,973,667 B2 | 12/2005 | Fritsch | 725/88 |
| 7,017,102 B1 | 3/2006 | Kristensson et al. | 714/786 |
| 7,054,643 B2 | 5/2006 | Trossen et al. | 455/454 |
| 7,065,779 B1 | 6/2006 | Crocker et al. | |
| 7,073,117 B1 | 7/2006 | Ireland et al. | 714/786 |
| 7,096,481 B1 | 8/2006 | Forecast et al. | 725/32 |
| 7,113,484 B1 | 9/2006 | Chapman et al. | |
| 7,114,172 B2 | 9/2006 | Lord | 725/80 |
| 7,228,356 B2 | 6/2007 | Nguyen et al. | 709/231 |
| 7,266,127 B2 | 9/2007 | Gupta et al. | 370/413 |
| 7,281,058 B1 | 10/2007 | Shepherd et al. | 709/238 |
| 7,412,149 B2 | 8/2008 | Cohen et al. | 386/68 |
| 7,433,946 B2 | 10/2008 | Shen et al. | |
| 7,447,978 B2 | 11/2008 | Hannuksela | 714/776 |
| 7,477,653 B2 | 1/2009 | Smith et al. | 370/432 |
| 7,490,344 B2 | 2/2009 | Haberman et al. | 370/432 |
| 7,584,404 B2 | 9/2009 | Kozintsev et al. | 714/776 |
| 7,610,606 B2 | 10/2009 | Carlucci et al. | 725/95 |
| 7,620,294 B2 | 11/2009 | Green et al. | 725/98 |
| 7,627,886 B2 * | 12/2009 | Barbanson et al. | 725/90 |
| 7,685,616 B2 | 3/2010 | Virdi et al. | 725/38 |
| 7,725,797 B2 | 5/2010 | Ver Steeg | 714/751 |
| 7,729,590 B2 | 6/2010 | Kosugi | 386/68 |
| 7,742,407 B2 | 6/2010 | Versteeg et al. | 370/230 |
| 7,761,902 B2 | 7/2010 | Liu et al. | 725/92 |
| 7,849,490 B2 | 12/2010 | Akhter | 725/120 |
| 7,870,465 B2 | 1/2011 | VerSteeg | 714/774 |
| 7,873,760 B2 | 1/2011 | Versteeg | 710/52 |
| 7,877,660 B2 | 1/2011 | Versteeg | 714/751 |
| 7,899,046 B2 | 3/2011 | Ver Steeg | 370/389 |
| 8,079,053 B2 * | 12/2011 | Yampanis et al. | 725/93 |
| 8,099,756 B2 | 1/2012 | Versteeg et al. | 725/95 |
| 8,370,889 B2 | 2/2013 | Sukumar et al. | |
| 2001/0025378 A1 | 9/2001 | Sakamoto et al. | |
| 2002/0019853 A1 | 2/2002 | Vange et al. | |
| 2002/0056107 A1 | 5/2002 | Schlack et al. | 725/35 |
| 2002/0057367 A1 | 5/2002 | Baldock | 348/554 |
| 2002/0067909 A1 | 6/2002 | Iivonen | 386/88 |
| 2002/0112244 A1 | 8/2002 | Liou et al. | 725/93 |
| 2002/0129129 A1 | 9/2002 | Bloch et al. | 717/175 |
| 2002/0181454 A1 | 12/2002 | Norman et al. | |
| 2002/0184637 A1 | 12/2002 | Perlman | 725/87 |
| 2002/0199203 A1 | 12/2002 | Duffy et al. | |
| 2003/0002849 A1 | 1/2003 | Lord | 386/46 |
| 2003/0007212 A1 | 1/2003 | Sala et al. | 398/72 |
| 2003/0007507 A1 | 1/2003 | Rajwan et al. | 370/468 |
| 2003/0007508 A1 | 1/2003 | Sala et al. | |
| 2003/0007724 A1 | 1/2003 | Gummalla et al. | 385/24 |
| 2003/0014752 A1 | 1/2003 | Zaslavsky et al. | 725/40 |
| 2003/0048808 A1 | 3/2003 | Stahl et al. | 370/487 |
| 2003/0093792 A1 * | 5/2003 | Labeeb et al. | 725/46 |
| 2003/0133458 A1 | 7/2003 | Sato et al. | 370/395 |
| 2003/0149975 A1 | 8/2003 | Eldering et al. | 725/34 |
| 2003/0156218 A1 | 8/2003 | Laksono | 709/231 |
| 2003/0159143 A1 | 8/2003 | Chan | 725/41 |
| 2003/0188253 A1 | 10/2003 | Kauschke et al. | 714/755 |
| 2003/0188311 A1 | 10/2003 | Yuen et al. | 725/42 |
| 2003/0196211 A1 | 10/2003 | Chan | 725/131 |
| 2003/0200551 A1 | 10/2003 | Kang | 725/120 |
| 2003/0217365 A1 | 11/2003 | Caputo | 725/95 |
| 2004/0111470 A1 | 6/2004 | Poulsen et al. | 709/204 |
| 2004/0133907 A1 | 7/2004 | Rodriguez et al. | |
| 2004/0184776 A1 | 9/2004 | Inoue et al. | 386/83 |
| 2004/0194147 A1 | 9/2004 | Craven et al. | 725/111 |
| 2004/0204945 A1 | 10/2004 | Okuda et al. | 704/500 |
| 2004/0225877 A1 | 11/2004 | Huang | 713/100 |
| 2004/0226044 A1 | 11/2004 | Goode | 725/95 |
| 2004/0228277 A1 | 11/2004 | Williams | |
| 2004/0260814 A1 | 12/2004 | Budge et al. | 709/227 |
| 2005/0155075 A1 | 7/2005 | Crichton | 725/105 |
| 2005/0166242 A1 | 7/2005 | Matsumoto et al. | 725/88 |
| 2005/0172326 A1 * | 8/2005 | Jerding et al. | 725/116 |
| 2005/0190781 A1 | 9/2005 | Green et al. | |
| 2005/0204251 A1 | 9/2005 | Moon et al. | 714/748 |
| 2005/0228892 A1 | 10/2005 | Riley et al. | 709/228 |
| 2005/0289618 A1 | 12/2005 | Hardin | 725/95 |
| 2005/0289623 A1 | 12/2005 | Midani et al. | 725/100 |
| 2006/0013247 A1 | 1/2006 | Koch et al. | 370/437 |
| 2006/0025149 A1 | 2/2006 | Karaoguz et al. | 455/452.2 |
| 2006/0074968 A1 | 4/2006 | Gyetko | 707/102 |
| 2006/0080707 A1 | 4/2006 | Laksono | |
| 2006/0112325 A1 | 5/2006 | Ducheneaut et al. | 715/500.1 |
| 2006/0212917 A1 * | 9/2006 | Boucher et al. | 725/105 |
| 2006/0236358 A1 | 10/2006 | Liu et al. | 725/117 |
| 2006/0242240 A1 | 10/2006 | Parker et al. | |
| 2007/0002789 A1 | 1/2007 | Zhang | 370/328 |
| 2007/0044130 A1 | 2/2007 | Skoog | 725/110 |
| 2007/0098015 A1 | 5/2007 | Eijsberg | 370/468 |
| 2007/0104226 A1 | 5/2007 | Ver Steeg et al. | 370/485 |
| 2007/0106782 A1 | 5/2007 | Ver Steeg et al. | 709/224 |
| 2007/0107023 A1 | 5/2007 | Ver Steeg et al. | 725/95 |
| 2007/0107024 A1 | 5/2007 | Ver Steeg et al. | 725/95 |
| 2007/0113246 A1 * | 5/2007 | Xiong | 725/39 |
| 2007/0130393 A1 | 6/2007 | Ver Steeg | 710/57 |
| 2007/0169158 A1 * | 7/2007 | Folgner et al. | 725/90 |
| 2007/0173993 A1 | 7/2007 | Nielsen et al. | |
| 2007/0186228 A1 | 8/2007 | Ramaswamy et al. | 725/14 |
| 2007/0192812 A1 | 8/2007 | Pickens et al. | 725/94 |
| 2007/0220577 A1 | 9/2007 | Kongalath | 725/131 |
| 2007/0261087 A1 | 11/2007 | Denney et al. | 725/95 |
| 2008/0008167 A1 | 1/2008 | Ver Steeg | 370/389 |
| 2008/0022190 A1 | 1/2008 | Ver Steeg | 714/776 |
| 2008/0022320 A1 | 1/2008 | Ver Steeg | 725/78 |
| 2008/0028279 A1 | 1/2008 | Ver Steeg | 714/776 |
| 2008/0028280 A1 | 1/2008 | Ver Steeg | 714/776 |
| 2008/0040767 A1 * | 2/2008 | McCarthy et al. | 725/132 |
| 2008/0109692 A1 | 5/2008 | Ver Steeg | 714/746 |
| 2008/0134005 A1 | 6/2008 | Izzat et al. | 714/774 |
| 2008/0192820 A1 | 8/2008 | Brooks et al. | 375/240.02 |
| 2008/0229379 A1 | 9/2008 | Akhter | 725/139 |
| 2008/0244667 A1 | 10/2008 | Osborne | 725/94 |
| 2008/0244679 A1 | 10/2008 | Sukumar et al. | 725/121 |
| 2009/0007199 A1 | 1/2009 | La Joie | 725/95 |
| 2009/0025027 A1 * | 1/2009 | Craner | 725/32 |
| 2009/0031392 A1 | 1/2009 | Ver Steeg et al. | 725/151 |
| 2009/0222875 A1 | 9/2009 | Cheng et al. | 725/147 |
| 2010/0046634 A1 | 2/2010 | Dai et al. | 375/240.25 |

FOREIGN PATENT DOCUMENTS

| | | |
|---|---|---|
| WO | WO 99/09741 | 2/1999 |
| WO | WO 01/69831 | 9/2001 |
| WO | WO 2005/020556 | 3/2005 |
| WO | 2005-112330 | 11/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |

(56) References Cited

FOREIGN PATENT DOCUMENTS

| | | |
|---|---|---|
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

U.S. Appl. No. 10/119,700, filed Apr. 10, 2002, Entitled "Systems, Methods and Apparatuses for Simulated Rapid Tuning of Digital Video Channels," Inventor: Peter Chan.
U.S. Appl. No. 11/164,102, filed Nov. 10, 2005, Entitled "Quality of Service Management in a Switched Digital Video Environment," Inventors: William C. VerSteeg, et. al.
U.S. Appl. No. 11/164,110, filed Nov. 10, 2005, Entitled "Channel Changes Between Services with Differing Bandwidth in a Switched Digital Video System," Inventor: William C. VerSteeg, et al.
U.S. Appl. No. 11/164,115, filed Nov. 10, 2005, Entitled "Atomic Channel Changes in a Switched Digital Video System," Inventor: William C. VerSteeg, et al.
U.S. Appl. No. 11/164,119, filed Nov. 10, 2005, Entitled "Bandwidth Management in Each Network Device in a Switched Digital Video Environment," Inventor: William C. VerSteeg, et al.
U.S. Appl. No. 11/164,147, filed Nov. 11, 2005, Entitled "Expedited Digital signal Decoding," Inventor: William C. VerSteeg.
U.S. Appl. No. 11/428,336, filed Jun. 30, 2006, Entitled "Systems and Methods of Synchronizing Media Streams," Inventor: William C. VerSteeg.
U.S. Appl. No. 11/550,441, filed Oct. 18, 2006, Entitled "Reducing Channel Change Time," Inventor: William C. VerSteeg, et al.
U.S. Appl. No. 11/829,255, filed Jul. 27, 2007, Entitled "Systems and Methods of Differentiated Channel Change Behavior," Inventor: William C. VerSteeg, et al.
Sherer, et al. "Appendix A Low Bandwidth Low Latency Channel Change," U.S. Appl. No. 60/719,146, filed Sep. 21, 2005.
European Patent Application, EP 1 335 521, Oct. 24, 2002.
European Patent Application, EP 1 589 706, Apr. 19, 2004.
European Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Feb. 22, 2008 in U.S. Appl. No. 11/164,147.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Jul. 11, 2008 in U.S. Appl. No. 11/164,110.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Sep. 26, 2008 in U.S. Appl. No. 11/164,147.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 8, 2009 in U.S. Appl. No. 11/164,110.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 18, 2009 in U.S. Appl. No. 11/164,147.
U.S. Official Action dated Mar. 24, 2009 in U.S. Appl. No. 11/164,102.
U.S. Official Action dated Apr. 29, 2009 in U.S. Appl. No. 11/692,457.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 17, 2009 in U.S. Appl. No. 11/164,119.
U.S. Official Action dated Jul. 27, 2009 in U.S. Appl. No. 11/164,147.
U.S. Official Action dated Jul. 31, 2009 in U.S. Appl. No. 11/482,439.
U.S. Official Action dated Aug. 5, 2009 in U.S. Appl. No. 11/164,115.
U.S. Official Action dated Aug. 5, 2009 in U.S. Appl. No. 11/164,110.
U.S. Official Action dated Aug. 18, 2009 in U.S. Appl. No. 11/164,102.
U.S. Official Action dated Sep. 11, 2009 in U.S. Appl. No. 11/482,437.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Oct. 20, 2009 in U.S. Appl. No. 11/692,457.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE

(56) References Cited

OTHER PUBLICATIONS

Service Center, New York, NY, US, vol. 4, No. 1, Jan. 1, 2004, pp. 7-28, XP011111220, ISSN: 1531-636X.
Shoaf et al. "IGMP Capabilities in Broadband Network Architercures", Whitepaper Juniper Networks, Mar. 1, 2005, pp. 1-25, XP002999116, p. 1-31.
Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
Jean-Louis Gauvreau, et al.: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.
De M Cordeiro C. et al., "Establishing a Trade-off Between Unicast and Multicast Retransmission Modes for Reliable Multicast Protocols." Modeling Analysis and Simulation of Computer and Telecommunication Systems, Aug. 29, 2000, pp. 85-91, XP010515402.
Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.
Lee, Min Jeong et al. "Peformance Improvements of Wireless IP Multicast Conference System based on Designated Receivers," IEEE International Conference on Atlanta, GA, USA, vol. 2, Jun. 7-18, 1998, pp. 807-811, XP010284688.
Nonnemacher, J. et al. "Parity-Based Loss Recovery for Reliable Multicast Transmission." IEEE/ACM Transactions on Networking, vol. 6, No. 4, Aug. 1998, pp. 349-361, XP000771969.
Paul, Sanjoy et al. "Reliable Multicast Transport Protocol (RMTP)" IEEE Journal on Selected Areas in Communications, vol. 15, No. 3, Apr. 1997, XP011054624.
Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.
Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.
Lacher, M.S., et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.
Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China , Oct. 28-31, 2002; New York, NY, vol. 1, Oct. 28, 2002, pp. 306-309, XP010628485, ISBN: 978-0-7803-7490-4.
Fitzek et al., "Error Control Teqhniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ffidocuments/SCI_2003.pdf> [retrieved on Apr. 21, 2008] pp. 4-5, figure 4.
Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germancy Sep. 11-14, 2005, Piscataway, NJ, USA, IEEE Sep. 11, 2005; pp. 1641-1645, XP010926492.
Rubenstein et al., "Improving Reliable Multicast Using Active Parity Encoding Services"; (APES), 1999, IEEEE, pp. 1248-1255.
International Search Report for PCT/US08/070851, dated Jul. 10, 2008.
Office Action for EP 07 812 632.3 dated Apr. 22, 2009.
U.S. Official Action dated Nov. 23, 2009 in U.S. Appl. No. 11/164,115.
U.S. Official Action dated Nov. 24, 2009 in U.S. Appl. No. 10/119,700.
U.S. Official Action dated Dec. 21, 2009 in U.S. Appl. No. 11/428,336.
U.S. Official Action dated Jan. 6, 2010 in U.S. Appl. No. 11/691,565.
U.S. Official Action dated Jan. 14, 2010 in U.S. Appl. No. 11/164,110.
U.S. Official Action dated Jan. 22, 2010 in U.S. Appl. No. 11/164,119.
U.S. Official Action dated Jan. 29, 2010 in U.S. Appl. No. 11/692,457.
U.S. Official Action dated Feb. 19, 2010 in U.S. Appl. No. 11/164,147.
U.S. Official Action dated Feb. 26, 2010 in U.S. Appl. No. 11/482,438.
International Preliminary Report dated Feb. 2, 2010, PCT/US2008/070851.
International Preliminary Report dated Feb. 2, 2010, PCT/US2008/070853.
Canadian Office Action dated Feb. 8, 2010, Application No. 2,663,907.
U.S. Official Action dated Mar. 19, 2010 in U.S. Appl. No. 11/550,441.
U.S. Official Action dated Mar. 24, 2010 in U.S. Appl. No. 11/829,255.
U.S. Official Action dated Jun. 22, 2010 in U.S. Appl. No. 11/164,119.
U.S. Official Action dated Jun. 23, 2010 in U.S. Appl. No. 11/691,565.
U.S. Official Action dated Jul. 22, 2010 in U.S. Appl. No. 11/692,457.
U.S. Official Action dated May 10, 2010 in U.S. Appl. No. 11/164,115.
U.S. Official Action dated Jun. 3, 2010 in U.S. Appl. No. 11/428,336.
U.S. Official Action dated Jun. 7, 2010 in U.S. Appl. No. 11/482,439.
Office Action for EP 07 812 632.3 dated Apr. 19, 2010.
Office Action for EP 07 844 052.6 dated May 18, 2010.
Chinese Patent Application, CN 1509027A, Jun. 30, 2004.
U.S. Official Action dated Sep. 1, 2010 in U.S. Appl. No. 11/829,255.
Canadian Office Action dated Jul. 30, 2010, Application No. 2,629,310.
Chinese Office Action dated Aug. 10, 2010, Application No. 200780038707.X.
U.S. Official Action dated Sep. 27, 2010 in U.S. Appl. No. 11/692,457.
U.S. Official Action dated Oct. 15, 2010 in U.S. Appl. No. 11/428,336.
Canadian Office Action dated Sep. 1, 2010, Application No. 2,629,320.
U.S. Official Action dated Nov. 1, 2010 in U.S. Appl. No. 11/164,119.
U.S. Official Action dated Nov. 19, 2010 in U.S. Appl. No. 11/691,565.
Office Action for EP 07 812 635.6 dated Apr. 19, 2010.
Office Action for EP 06 850 128.7 dated Apr. 22, 2010.
Office Action for EP 06 850 128.7 dated Dec. 16, 2010.
U.S. Official Action dated Jan. 24, 2011 in U.S. Appl. No. 11/829,274.
Canadian Office Action dated Dec. 30, 2010, Application No. 2,657,178.
Canadian Office Action dated Jan. 6, 2011, Application No. 2,657,174.
U.S. Official Action dated Mar. 2, 2011 in U.S. Appl. No. 11/428,336.
Chinese Decision on Rejection, dated Jan. 26, 2011, Application No. 200780038707.X.
Canadian Office Action dated Feb. 21, 2011, Application No. 2,663,704.
U.S. Official Action dated Apr. 13, 2011 in U.S. Appl. No. 11/692,457.
Canadian Office Action dated Feb. 15, 2011, Application No. 2,629,313.
Canadian Office Action dated Mar. 30, 2011, Application No. 2,657,219.
Canadian Office Action dated Apr. 4, 2011, Application No. 2,657,210.
Mexican Office Action dated May 26, 2011, Application No. MX/a/2009/004151.
Office Action for EP 08 743 985.7 dated Sep. 30, 2011.

(56) References Cited

OTHER PUBLICATIONS

Canadian Office Action dated Oct. 6, 2011, Application No. 2,663,907.
Canadian Office Action dated Nov. 14, 2011, Application No. 2,657,174.
Office Action for EP 08 743 986.5 dated Nov. 23, 2012.
Canadian Office Action dated Jan. 11, 2013, Appln No. 2,682,364.
Office Action for EP 06 850 129.5 dated Jan. 18, 2013.
Canadian Office Action dated Feb. 11, 2013, Appln No. 2,663,907.
Office Action for EP 07 812 631.5 dated Mar. 22, 2013.
U.S. Official Action dated Mar. 28, 2012 in U.S. Appl. No. 11/692,457.
EP Communications Summons to Attend Oral Proceedings dated Mar. 8, 2012, Application No. 06850128-7.
Canadian Office Action dated Mar. 2, 2012, Application No. 2,629,310.
Canadian Office Action dated Mar. 30, 2012, Application No. 2,680,851.
Chinese Notice on Reexamination dated Mar. 30, 2012, Application No. 200780038707.X.
Chinese Second Office Action dated Apr. 1, 2012, Appln No. 200880100567.9.
Canadian Office Action dated Jun. 4, 2012, Application No. 2,629,320.
U.S. Official Action dated Aug. 10, 2011 in U.S. Appl. No. 11/428,336.
Canadian Office Action dated Jun. 28, 2011, Application No. 2,682,364.
Canadian Office Action dated Jun. 28, 2011, Application No. 2,663,704.
Canadian Office Action dated Jul. 27, 2011, Application No. 2,629,320.
U.S. Official Action dated Jan. 3, 2012 in U.S. Appl. No. 11/829,255.
Chinese Office Action dated Oct. 25, 2011, Application No. 200880100567.9.
Office Action for EP 08 743 986.5 dated Jan. 19, 2012.
U.S. Official Action dated Jun. 27, 2011 in U.S. Appl. No. 11/829,255.
Canadian Office Action dated Jul. 24, 2013, Appln No. 2,629,313.
Canadian Office Action dated Aug. 1, 2013, Appln No. 2,680,581.
U.S. Official Action dated Oct. 15, 2013 in U.S. Appl. No. 11/829,255.
Canadian Office Action dated Oct. 15, 2013, Application No. 2,666,861.
Canadian Office Action dated Dec. 6, 2013, Application No. 2,629,310.
EP Communications Summons to Attend Oral Proceedings dated Oct. 30, 2013, Appln No. 08743986.5.
Office Action for EP 07 812 635.6 dated Feb. 7, 2011.
U.S. Official Action dated Mar. 30, 2011 in U.S. Appl. No. 11/164,110.
Chinese Third Office Action dated Jul. 27, 2012, Appln No. 200880100567.9.
Canadian Office Action dated Aug. 24, 2012, Appln No. 2,666,861.
EP Communications Summons to Attend Oral Proceedings dated Jun. 8, 2012, Application No. 07840350.8.
Chinese Notice on Reexamination dated Jun. 21, 2012, Application No. 200780038707.X.

\* cited by examiner

SYSTEMS AND METHODS OF DIFFERENTIATED REQUESTS FOR NETWORK ACCESS

CROSS REFERENCE TO RELATED APPLICATIONS

This application is related to U.S. patent application Ser. No. 11/829,255 filed Jul. 27, 2007 entitled "Systems and Methods of Differentiated Requests for Network Access", which is entirely incorporated by reference herein.

FIELD OF THE DISCLOSURE

The present disclosure relates to digital set-tops, and more specifically, to systems and methods of differentiated requests for network access.

BACKGROUND

Many consumers receive entertainment programming in their homes from a cable television operator. Many of today's cable offerings are broadcast using digital signals, which make more efficient use of communication bandwidth, and thus allow more programming to be carried on the same cable. In these cable systems, video programming (e.g., television programs, movies, etc.) is encoded using a Motion Pictures Experts Group (MPEG) standard, and encapsulated into an MPEG transport stream. The MPEG transport stream may be transmitted from a cable head-end to the customer premises by a number of subscriber delivery mechanisms, such as coax cable or hybrid fiber-coax (HFC) cable, or over twisted pair cable running a broadband technology such as digital subscriber loop (DSL). At the customer premises, a digital home communication terminal (DHCT) decodes the programming and generates an analog or digital picture signal. The picture is displayed by a television connected to the DHCT.

Video programming is delivered to the DHCT over a logical channel. Logical channels are also used to deliver other kinds of data, some of which is seen by the user (e.g., an electronic program guide), and some of which is not (e.g., system data such as entitlements and channel maps.) In some environments, a logical channel corresponds to a particular frequency. In other environments, a logical channel corresponds to a timeslot within a particular frequency. In other environments, a logical channel corresponds to a network unicast or broadcast address.

A DHCT, or group of DHCTs sharing the same subscriber connection, can receive multiple types of programs or data simultaneously, since each is carried in a separate logical channel. The set of logical channels received over the subscriber connection typically changes over time. Sometimes the change in the channels delivered to a subscriber is a result of direct channel changes by users. Other times, the channel change is indirect, resulting from requests made by the DHCT for various types of data (as described above) which are also carried over logical channels. Conventional DHCTs treat all types of channel changes in the same manner. However, it would be advantageous for different types of channel changes to be handled differently by the DHCT. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
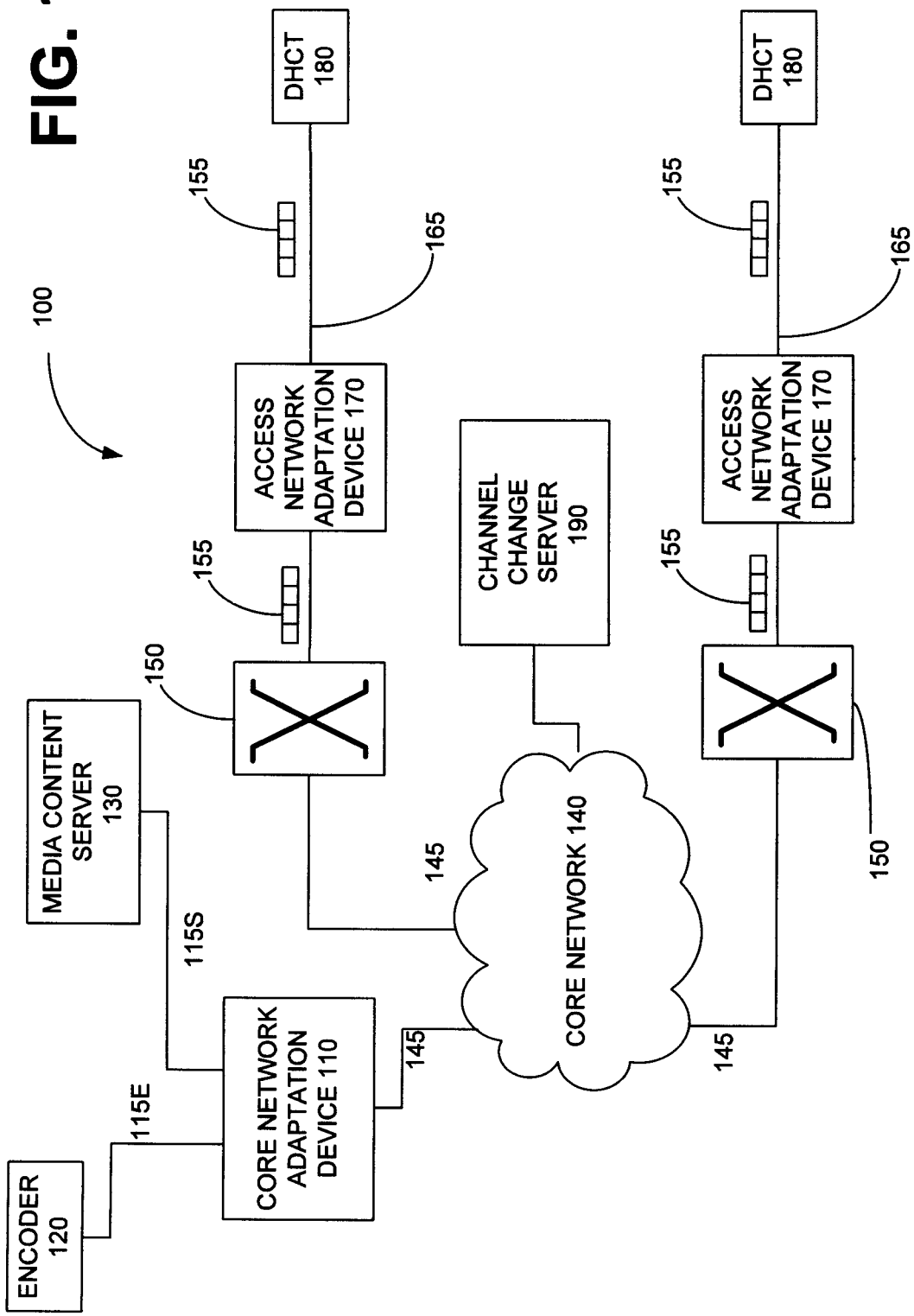
FIG. 1 is a block diagram of an environment in which one embodiment of a system and method of differentiated requests for network access is located.

FIG. 1 is a block diagram of an environment 100 in which one embodiment of a system and method of differentiated requests for network access is located. A core network adaptation device 110 receives one or more digital media streams 115 for delivery to various subscribers. In this disclosure, the term "media stream" refers to a stream that includes video frames, audio frames, hypermedia, multimedia, or any combination thereof. Common encoding formats for media streams 115 include MPEG-2, MPEG-4, and VC-1. In some environments, the encoded media stream represents a single program, and thus contains a video and an audio stream multiplexed together into a single program transport stream (SPTS).

Media streams 115 may be provided from various sources. In the example environment of FIG. 1, media stream 115E is provided by an encoder 120 which encodes an analog signal from a media content source, such as a cable network or an on-air television station, and media stream 115S is provided from a digital media content server 130. Other ways of providing media streams 115 to core network adaptation device 110 should be familiar to a person of ordinary skill in the art, and are intended to be within the scope of this disclosure.

Core network adaptation device 110 prepares media streams 115 for transport over a core network 140. Though the details of this adaptation depend on the type of core network, the adaptation generally involves encapsulating media streams 115 into packets, using broadcast addressing for the packets, and combining packet program streams. The result is a stream 145 suitable for transport across core network 140 that contains multiple media streams 115, each containing a program.

A person of ordinary skill in the art should be familiar with the concept and practice of encapsulating information into packets, and with broadcast addressing techniques, so these features will not be discussed further in this disclosure. In one embodiment, MPEG Transport Stream (TS) packets are encapsulated within layer-3 Internet Protocol (IP) packets. In another embodiment, the MPEG TS packets are encapsulated within real-time transport (RTP) packets, which are in turn encapsulated within IP packets. In another embodiment, VC-1 streams are used rather than MPEG streams.

Multiple programs carried within the stream 145, destined for many different subscribers, are transported over core network 140, and delivered to switches 150 located at the network edge. Each switch 150 selects, for a particular subscriber, a subset of programs carried in stream 145, and produces a stream 155 that is addressed to that subscriber. Stream 155 is delivered, via a subscriber connection 165, to those subscribers connected to switch 150. In some embodiments the stream 155 uses multicast addresses, while other embodiments unicast addresses are used. A person of ordinary skill in the art should be familiar with the use of multicast and unicast addresses to deliver packets to groups of subscribers and single subscribers, respectively.

Stream 155 is provided to an access network adaptation device 170, which prepares stream 155 for travel over subscriber connection 165. The details of the adaptation vary depending on the type of subscriber connection 165 and on the subscriber equipment. In general, access network adaptation device 170 converts between the lower layer protocols used by switch 150 (e.g., high speed Ethernet) and the protocols used on subscriber connection 165 (e.g., DSL, HFC, Fiber to the Home). Thus, access network adaptation device 170 may be implemented as a cable modem termination system (CMTS) in an HFC environment, or a DSL access multiplexer (DSLAM) in a DSL environment. Some embodiments of access network adaptation device 170 also perform encapsulation, de-encapsulation, or both (as when converting from one packet format to another). Some embodiments act as a multiplexer to combine additional streams such as a voice stream or a data stream.

After adaptation by access network adaptation device 170, stream 155 is transmitted over one of the subscriber connections 155 to a digital home communication terminal (DHCT) 180. DHCT 180 receives stream 155, and decodes the individual program streams carried within to produce a video signal. DHCT 180 supplies the video signal to a display (not shown) for viewing by the customer. In one embodiment, the display is a television. In another embodiment, the display is a computer monitor. In some embodiments, DHCT 180 also decodes an audio stream and produces audio signal which accompanies the video signal.

As explained earlier, a subset of program streams is selected by switch 150 for delivery to a particular subscriber location. Each of these program streams can be viewed as being carried on a different logical channel. DHCT 180 communicates with a channel change server 190 to request that particular program streams, or logical channels, be included in the stream 155 received by that subscriber. For example, DHCT 180, in response to a user request to watch the FOX network, requests from channel change server 190 a "channel change" to FOX. Channel change server 190 in turn requests the switch 150 serving that subscriber to include the FOX program stream in stream 155 delivered to that DHCT 180 over the subscriber connection 165.

In some embodiments, channel change server 190 and/or switch 150 fulfill channel change requests by joining and leaving particular multicast groups, each of which carries a set of logical channels. A channel change request may also be fulfilled by switching stream 155 to a unicast stream (not shown) that is a cached version of media stream 115 but is instead is addressed to a particular DHCT 180. Use of a unicast rather than a multicast stream reduces the time it takes a DHCT 180 to receive and decode a new program source. The use of unicast streams to speed up a channel change is often referred to as "fast channel change" or "instant channel change."

Figure 2:
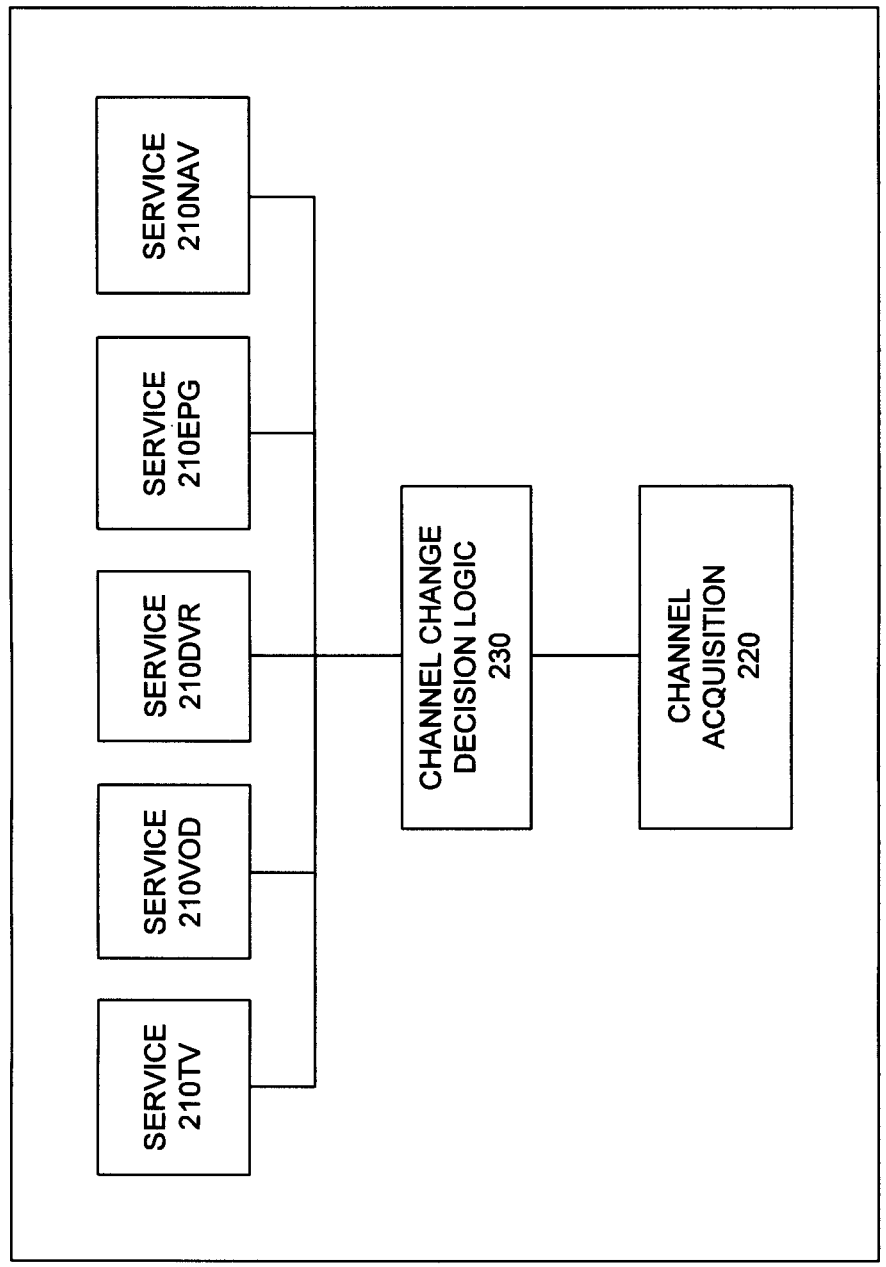
FIG. 2 is a block diagram showing selected software components in one embodiment of the DHCT in FIG. 1.

FIG. 2 is a block diagram showing selected software components in one embodiment of DHCT 180. DHCT 180 includes components which provide services to the user. An exemplary list of such components includes, but is not limited to, live television 210TV, video-on-demand 210VOD, an electronic program guide 210EPG, and digital video recording 210DVR. A navigator 210NAV allows a user to navigate among these services, and may also allow the user to access various settings of the DHCT 180 (e.g., volume, parental control, etc.) In one embodiment, these services 210 are implemented as user-mode applications, rather than as kernel-mode components.

DHCT 180 also includes a channel acquisition component 220. Channel acquisition component 220 is responsible for acquiring, or changing to, a logical channel. Channel acquisition component 220 may involve hardware and/or software components, and is typically platform-specific: in some embodiments, channel acquisition involves tuning to an RF channel; in other embodiments, channel acquisition involves requesting an IPTV stream from a multicast or unicast server such as channel change server 190 (FIG. 1). In some embodiments, DHCT 180 can receive multiple channels simultaneously. In some embodiments, channel acquisition component 220 is implemented as kernel-mode code interacting with an RF tuner or a network interface.

Requests for channel acquisition, or channel change, originate from different sources and for different reasons. Some channel acquisition requests are initiated directly by a user. One example of such a user-initiated channel change is when a user watching live TV, where the user indicates to service 210TV a channel change, for example, through a remote control. In this case, service 210TV is the source of the channel change request. Other channel change requests are system-initiated rather than user-initiated. This may occur, for example, when service 210DVR selects a channel in order to record a scheduled program. In this case, service 210DVR originates the channel change request. Other channel change requests are system-initiated even though the request is an indirect result of a user selection. One example of this type of channel change request can occur when a user interacting with the service 210EPG asks to view detailed program description information. In this scenario, service 210EPG obtains new guide information over an EPG channel. Another example of a channel change request originating from service 210EPG occurs when service 210EPG periodically downloads updates to the guide information. These channel change scenarios are merely examples. Other channel change scenarios should be familiar to a person of ordinary skill in the art, and are intended to be within the scope of this disclosure.

The channel change requests are received by channel change decision logic 230, which instructs channel acquisition component 220 to actually perform the channel change after determining appropriate parameters for the channel acquisition call, based on the source of the request and/or the reason for the request. For example, channel change decision logic 230 might utilize a "fast channel change" mode if the request was user-initiated and the configuration of subscriber connection 165 and/or core network 140 was such that a channel change would use bandwidth. Some embodiments of channel change decision logic 230 also take into account information about characteristics of the subscriber connection 165 and/or core network 140 when determining the appropriate parameters for a channel change request. Thus, channel change decision logic 230 acts as an intermediary between services and channel acquisition component 220 and insulates these services from network specifics.

A person of ordinary skill in the art should understand that software components referred to herein include executable code that is packaged, for example, as a standalone executable file, a library, a shared library, a loadable module, a driver, or an assembly, as well as interpreted code that is packaged, for example, as a class.

Figure 3:
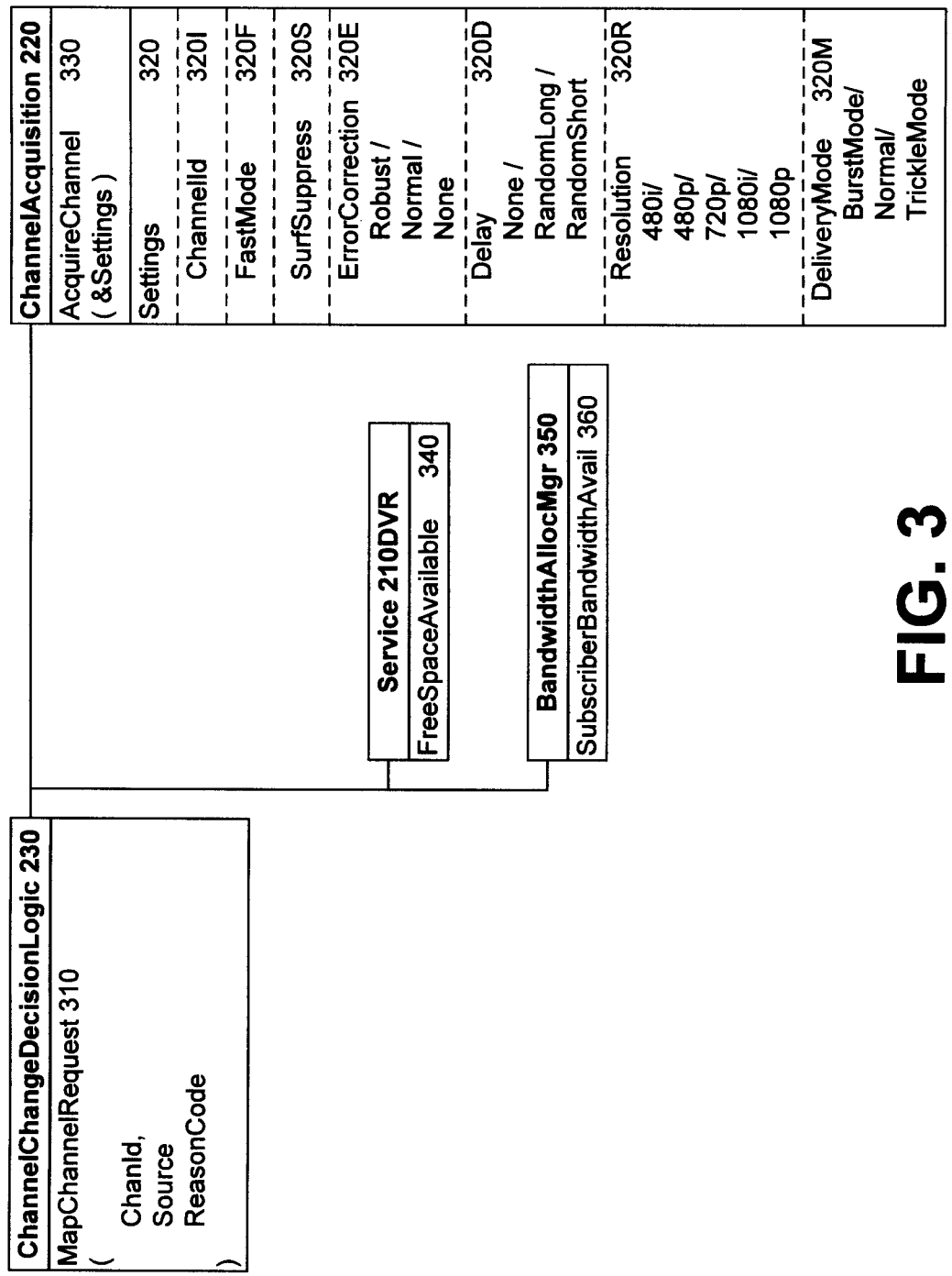
FIG. 3 is an object diagram of selected software components present in one embodiment of the DHCT in FIG. 1.

FIG. 3 is an object diagram of selected software components present in one embodiment of DHCT 180. Channel change decision logic 230 includes a function MapChannelRequest 310, which is called by an application in order to request a channel change. Function MapChannelRequest 310 has inputs ChannelId, Source, and ReasonCode. As its name suggests, the ChannelId parameter identifies the target channel. As described above, the Source parameter identifies the component that made the request, and ReasonCode identifies the reason for the request (which may also be viewed as the type of request). In the example of FIG. 3, Source and ReasonCode are distinct parameters, and are each enumerated values. However, a variety of identification mechanisms can be used, as would be understood by a person of ordinary skill in the art. For example, Source and ReasonCode may be combined into a single parameter.

Channel acquisition component 220 includes a data member Settings 320, and a function AcquireChannel 330. As its name suggests, AcquireChannel 330 is invoked to change to, or acquire a particular channel, and interacts with software and/or hardware components (e.g. channel acquisition component 220) to make this happen. AcquireChannel 330 uses the values in Settings 320 to control various aspects of the request for network access. In the example of FIG. 3, Settings 320 include ChannelId 320I, FastMode 320F, SurfSuppress 320S, ErrorCorrection 320E, Delay 320D, Resolution 320R, and DeliveryMode 320M. As will be described in more detail in connection with FIG. 4, the function MapChannelRequest 310 in channel change decision logic 230 sets the values of one or more parameters in Settings 320, based on the source of the request and/or the reason for the channel change request, before the call to AcquireChannel 330.

ChannelId 320I controls which channel is acquired. In some scenarios, MapChannelRequest 310 sets ChannelId 320I in Settings 320 to the same value as its parameter. In other scenarios (examples of which will be described later), MapChannelRequest 310 in channel change decision logic 230 may set ChannelId 320I in Settings 320 to a different value, so that the service invoking MapChannelRequest 310 gets a different result than what was requested. A person of ordinary skill in the art should be familiar with a variety of mechanisms for passing this information back to the service.

FastMode 320F controls whether "fast channel change" techniques are used by the server. (Such techniques were described briefly in connection with FIG. 1.) ErrorCorrection 320E controls the error correction (e.g., the type of FEC code, the depth of the FEC code, the use of selective retransmission, etc.) used by channel change server 190. DeliveryMode 320M controls the rate at which the newly acquired program stream will be provided to DHCT 180 in an environment where the delivery rate is variable, such as an IPTV environment. In the example of FIG. 3, enumerated values such as BurstMode, Normal, and TrickleMode are used for DeliveryMode 320M, but in other embodiments DeliveryMode 320M may specify a bitrate.

In some embodiments, these parameters are communicated to channel change server 190. In other embodiments, these parameters are used to select an appropriate server from multiple channel change servers 190, based on the capabilities of the various servers 190. For example, different channel change servers 190 may vary in their error correction capabilities, or in their bitrate capabilities. FastMode 320F, ErrorCorrection 320E and DeliveryMode 320M are particularly useful in an environment which uses IP as a delivery mechanism, but a person of ordinary skill in the art will recognize that these settings have wider applicability as well.

Delay 320D controls the amount of delay between the request to channel acquisition component 220 and the actual channel change. For example, random amounts of delay may be used to insure that large numbers of DHCTs do not download guide data at midnight, or change channels on the hour or half-hour, either of which could overload equipment at the head-end. In the example of FIG. 3, enumerated values such as RandomLongPeriod, RandomShortPeriod, and Immediate are used, but in other embodiments Delay 320D may specify an actual amount of time. In some embodiments, the delay is implemented in DHCT 180, while in other embodiments Delay 320D is communicated to the channel change server 190 or to the tuner.

SurfSuppress 320S controls whether network signaling is suppressed when the user is changing from one channel to another in a relatively rapid fashion (i.e., "channel surfing"). Under such conditions, sending each and every channel change within the series of channel changes is wasteful of network bandwidth. That is, if the user moves quickly from channel 2 to channels 5, 8, and 11, it is unnecessary to send the requests for channels 5 and 8 to channel change server 190, since the user has moved on to another channel before the previous channel is delivered. A person of ordinary skill in the art should be aware of various techniques to detect this user "channel surfing" behavior. For example, a series of multiple keypresses indicating channel change can be treated as a single request. In one embodiment, SurfSuppress 320S is a boolean, where a value of True indicates that signaling to the network (e.g., channel change requests) is suppressed during episodes of user channel surfing behavior. A value of False for this parameter indicates that network signaling is transmitted to the network as usual.

Resolution 320R controls the resolution of the program stream delivered on the requested channel. This feature is useful when multiple channels are available that carry the same programming but differ in their resolution (e.g., one program delivers in high definition, and another in standard definition). In such cases, channel change decision logic 230 may transform a request by an application (e.g., service 210DVR or service 210TV) for a logical channel with high resolution to a change to an analogous channel with lower resolution, or vice versa. In some embodiments, Resolution 320R also supports thumbnails, which are frames that are smaller than normal size.

As mentioned above, channel change decision logic 230 uses Source and/or ReasonCode to determine appropriate values for Settings 320. Channel change decision logic 230 may also use data provided by other components in making this decision. In the example of FIG. 3, service 210DVR tracks the amount of free space available for program recording, and makes this available as data member FreeSpaceAvailable 340. A Bandwidth Manager component 350 tracks the subscriber connection bandwidth that is in use by DHCT 180 and (in some embodiments) by other DHCTs also sharing the same subscriber connection 165. Bandwidth Manager 350 provides this information through data member SubscriberBandwidthAvailable 360.

A person of ordinary skill in the art should recognize the objects illustrated in FIG. 3 as abstractions chosen to illustrate how one embodiment of systems and methods of differentiated requests for network access partitions functionality among components. Such a person should also recognize that other divisions of functionality are also possible, and these other possibilities are intended to be within the scope of this disclosure. Furthermore, although the objects in FIG. 3 may be described in terms of specific data structures such as lists, flags, pointers, and collections, a person of ordinary skill in the art should appreciate that other data structures providing similar functionality can be used instead. As just one example, a particular implementation might use an array instead of a linked list.

In general, the objects used by the systems and methods of differentiated requests for network access are described herein in terms of code and data, rather than with reference to a particular hardware device executing that code. Furthermore, although the system and methods are described in object-oriented terms, there is no requirement that the systems and methods be implemented in an object-oriented language. Rather, one of ordinary skill in the art will understand that the systems and methods can be implemented in any programming language, and executed on any hardware platform.

As described above, channel change decision logic 230 encapsulates network-specific knowledge about the appropriate parameters to use in a channel change, while channel acquisition component 220 encapsulates platform-specific knowledge about how to effect a channel change. The decision process used by channel change decision logic 230 to choose appropriate values for these parameters will now be described in connection with the flowchart of FIG. 4.

The process 400 begins at block 410, where a channel change request is received. Next, block 415 examines the request to determine whether it was user-initiated. If the request was user-initiated, processing continues at block 420, which initializes Settings 320 as follows: FastMode 320F to True; ErrorCorrection 320E to Robust; and Delay 320D to Random. Processing then continues at block 425, which acquires the channel identified in the request using Settings 320 (e.g., through AcquireChannel 330). Process 400 is then complete.

If the request was not user-initiated, processing continues instead at block 430, which sets FastMode 320F to False. Next, at block 435 the source of the request is examined. If the request originated from service 210DVR, processing continues at block 440, where further examination occurs in order to appropriately set the values in Settings 320. However, if the request originated from a source other than service 210DVR, processing continues at block 425. As described earlier, at block 425 the channel identified in the request is acquired, using Settings 320, and process 400 is complete.

Returning now to block 440, which is executed if service 210DVR was the source of the channel change request, Delay 320D is set to Random and ErrorCorrection 320E is set to Robust. In one embodiment, Robust indicates a level of error correction which is more stringent compared to the level used when a user is the source of the channel change request. A person of ordinary skill in the art should appreciate that a variety of combinations of error-correcting behavior meet this condition. In one embodiment, "Robust" error correction includes the use of forward error-correcting codes (FEC) and/or selective retransmission.

Blocks 445 and 450 are optional. Block 445 gets the bandwidth available on subscriber connection 165. Block 450 determines the DVR storage space available for programming. Processing then continues at block 455 (FIG. 5), which determines a desired resolution based on available bandwidth and/or DVR storage space. The details of 455 will be discussed below in connection with the flowchart of FIG. 5.

Next, block 460 compares the resolution of the programming carried by the channel identified in the request to the desired resolution determined at block 455. If the two values are equal, then no channel adjustment is necessary and processing continues at block 480, described below. However, if the resolution of the requested channel is different than the desired resolution, block 465 attempts to find an analogous channel carrying the same program but equal to, or at least closer to, the desired resolution. A person of ordinary skill in the art should be familiar with mechanisms to determine what program is carried on a particular channel at a particular time, as well as the resolution of the program and the running time (length) of the program.

Block 470 determines if an analogous channel is found. If Yes, block 475 updates ChannelId 320I in Settings 320 with the analogous channel, and updates Resolution 320R to the desired resolution determined at block 455. Otherwise, ChannelId 320I and Resolution 320R are unchanged.

Next, block 480 sets Delivery Mode 320M to BurstDelivery, NormalDelivery or TrickleDelivery, depending on available subscriber bandwidth and the resolution of the identified channel. If the available bandwidth is more than enough to support the chosen resolution, channel change decision logic 230 uses BurstDelivery. If the available bandwidth is not enough to support the chosen resolution, channel change decision logic 230 uses TrickleDelivery. Otherwise, DeliveryMode 320M is set to NormalDelivery. Having set DeliveryMode 320M, processing continues at block 425 where the selected channel is acquired using Settings 320, and process 400 is complete.

Figure 4:
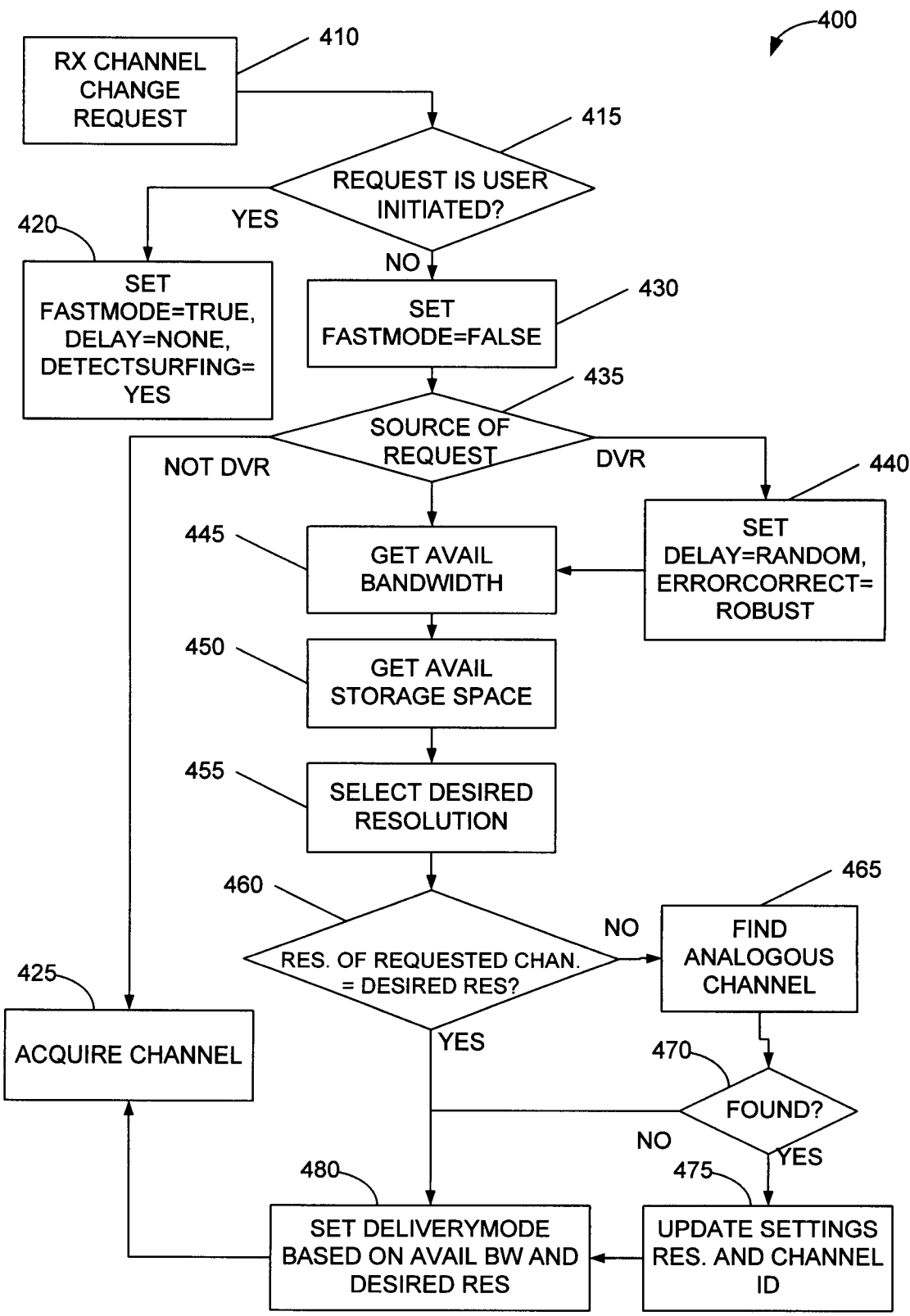
FIG. 4 is a flowchart showing a decision process implemented by one embodiment of the channel change logic in FIG. 1.
Figure 5:
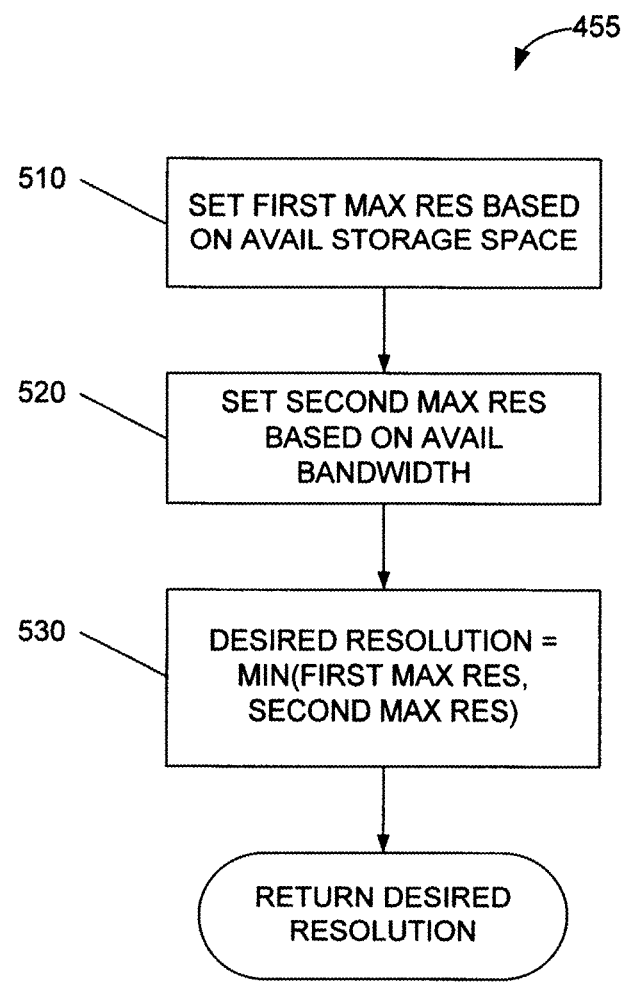
FIG. 5 is a flowchart showing further details of block 455 in FIG. 4.

FIG. 5 is a flowchart showing further details of block 455 (ChooseResolution) from FIG. 4. The process of choosing an appropriate resolution for the requested channel begins with block 510, which determines a first maximum resolution based on the available DVR storage space and the length of the program. Next, at block 520, channel change decision logic 230 determines a second maximum resolution based on the available bandwidth of subscriber connection 165. This available bandwidth value is provided to channel change decision logic 230 by a bandwidth manager, where the functionality of a bandwidth manager should be familiar to a person of ordinary skill in the art. In some embodiments, the available bandwidth is subject to arbitration and adjustment by the manager, and in such cases process 400 is executed again to use the adjusted value.

After block 520, block 530 chooses the resolution by setting a desired resolution to the minimum of the two maximum values calculated in blocks 510 and 520. The process completes, returning the desired resolution to the caller (block 455 in FIG. 4).

Although channels can carry video programming (e.g., viewing via live TV service 210TV or recording via DVR service 210DVR), other types of data are also provided via channels. Examples of such data include EPG data, channel icon bitmaps for the EPG, entitlements, channel maps, and updates to code within DHCT 180. Other types of data carried over a channel will also be recognized by a person of ordinary skill in the art, and are intended to be within the scope of this disclosure. A request to acquire one of these types of channels can be viewed as a request for access to, or bandwidth of, the downstream network, since such a request will result in data being sent from core network 140 down to DHCT 180 over subscriber connection 165.

Figure 6:
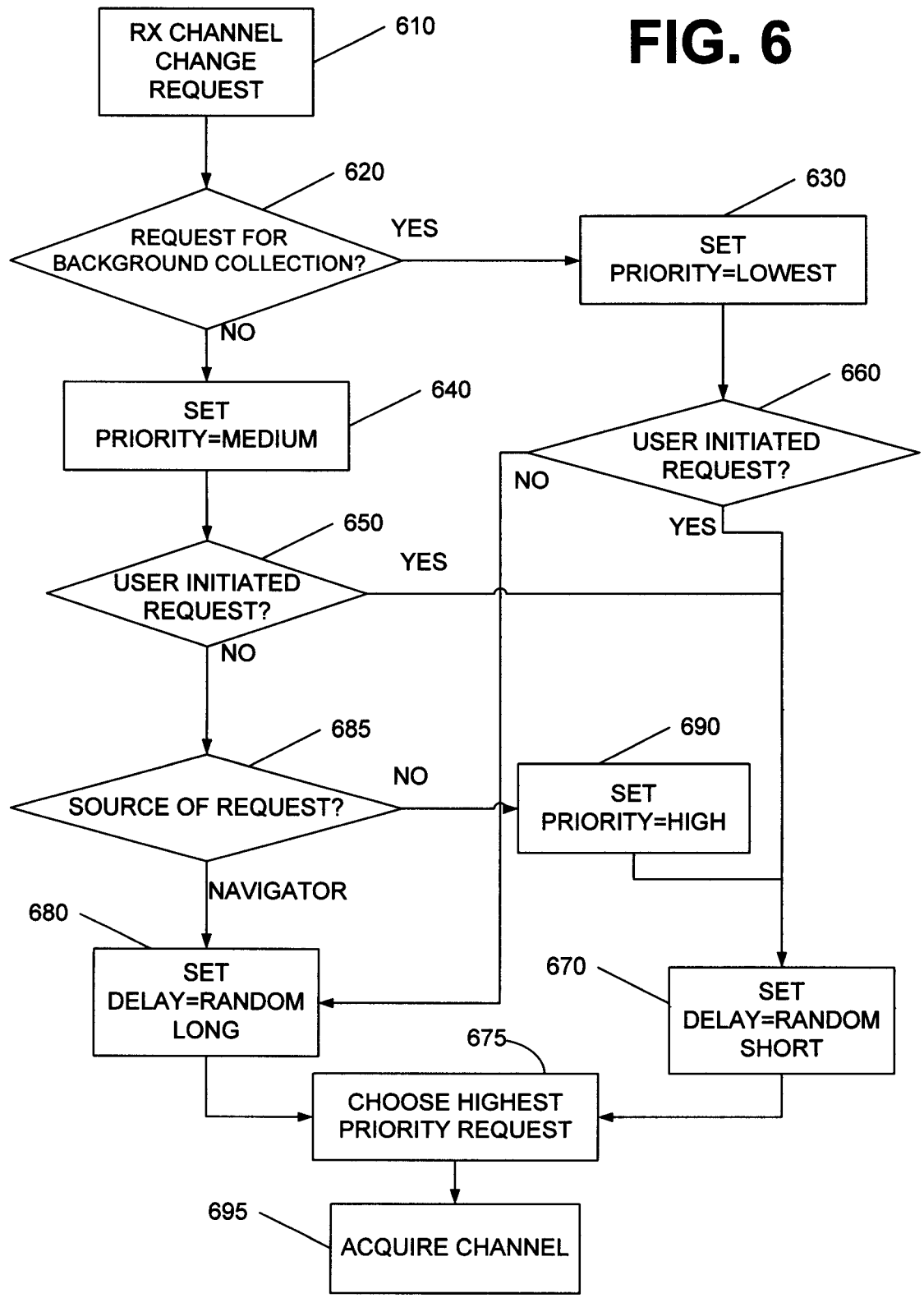
FIG. 6 is a flowchart of a process used by another embodiment of the channel change decision logic in FIG. 2.

FIG. 6 is a flowchart of a process used by another embodiment of channel change decision logic 230, one which chooses appropriate values for parameters used in a channel change that is a request for access to the downstream network. Channel change decision logic 230 chooses values based on the reason for, and/or source of, the request for access. In some scenarios, the source of the request is the user. In other scenarios, the reason for request involves the user, but indirectly: for example, a user viewing the electronic program guide (EPG) may scroll ahead to the future, so that DHCT 180 requests additional program guide data not already available in DHCT 180. In other scenarios, DHCT 180 initiates the request without any input from the user (e.g., a regularly scheduled update of EPG data).

The process 600 begins at block 610, where the request for network access is received. If channel change decision logic 230 determines (at block 620) that the request is for an activity that involves background data collection, then block 630 sets a priority variable to the lowest value. Background activities are those that do not require immediate display of requested data to the user. Examples of background activities are scheduled updates to guide data, or download of channel icons. If, on the other hand, block 620 determines that the request does not involve background data collection, then block 640 sets the priority variable to an intermediate value between lowest and highest. Processing then continues at block 650, which will be discussed below.

Returning to block 630 (executed if collection in background), next to execute is block 660, which determines whether the network access request was user-initiated. If Yes, then block 670 initializes Delay 320D (within Settings 320 of channel acquisition component 220) to RandomShort, and continues to block 675, where the highest priority request is chosen. However, if block 660 determines that the network access request was not user-initiated, then block 680 initializes Delay 320D to RandomLong. Processing then continues at block 675 to choose the highest priority request. (Block 675 will be discussed in further detail below.) A person of ordinary skill in the art should appreciate that "RandomShort" and "RandomLong" are randomly chosen values, with the range for RandomShort values being less than the range for RandomLong values.

Returning to block 650 (executed after blocks 620 and 640), it has been determined that high priority is appropriate for these requests because the request are not background data collection and are not user initiated. Such requests are for "critical activities", in that the DHCT has an immediate use for the data. Under such conditions, block 685 executes next to determine the source of the network access request. If the network access request was not received from navigator 210NAV, then block 690 sets the priority variable to the highest value, and block 670 initializes Delay 320D to RandomShort. Examples of a source other than the navigator include: a channel map component requesting an update to the DHCT channel map; an entitlement component requesting an update to DHCT entitlements or conditional access keys; and an update component requesting an update to code within the DHCT. Such requests can be considered "system critical activities." Processing continues at block 675, which chooses the network access request with the highest priority, if more than one request has been received but not yet processed. Finally, at block 695 the channel identified in the request is acquired using Settings 320 (e.g., through AcquireChannel 330). Process 600 is then complete.

However, if block 685 determines the source of the network access request was navigator 210NAV (this is a "navigator critical activity"), then processing continues at block, which initializes Delay 320D to RandomLong. Processing then completes with the execution of block 675, which chooses the network access request with the highest priority, and block 695, which acquires the channel identified in the request.

A person of ordinary skill in the art should realize that process 600 may use a variety of mechanisms when testing various characteristics of the request for network access (e.g., user-initiated, source of request, whether request involves background data collection.) As merely one example, the source and/or reason code associated with the request may be implemented as a bitmap, where each bit encodes one of the aforementioned characteristics. Various enumerated values can then be formed from the bitmap so that process 600 operates in a desired manner. For example, to achieve a random delay with a long period and the lowest priority, the bits would be set/cleared as follows: Background=Set; UserInitiated=Set; Source=Don't Care. As another example, the following bitmap will result in a random delay with a short period and the highest priority: Background=Clear; UserInitiated=Clear; Source=NOT (Navigator).

Figure 7:
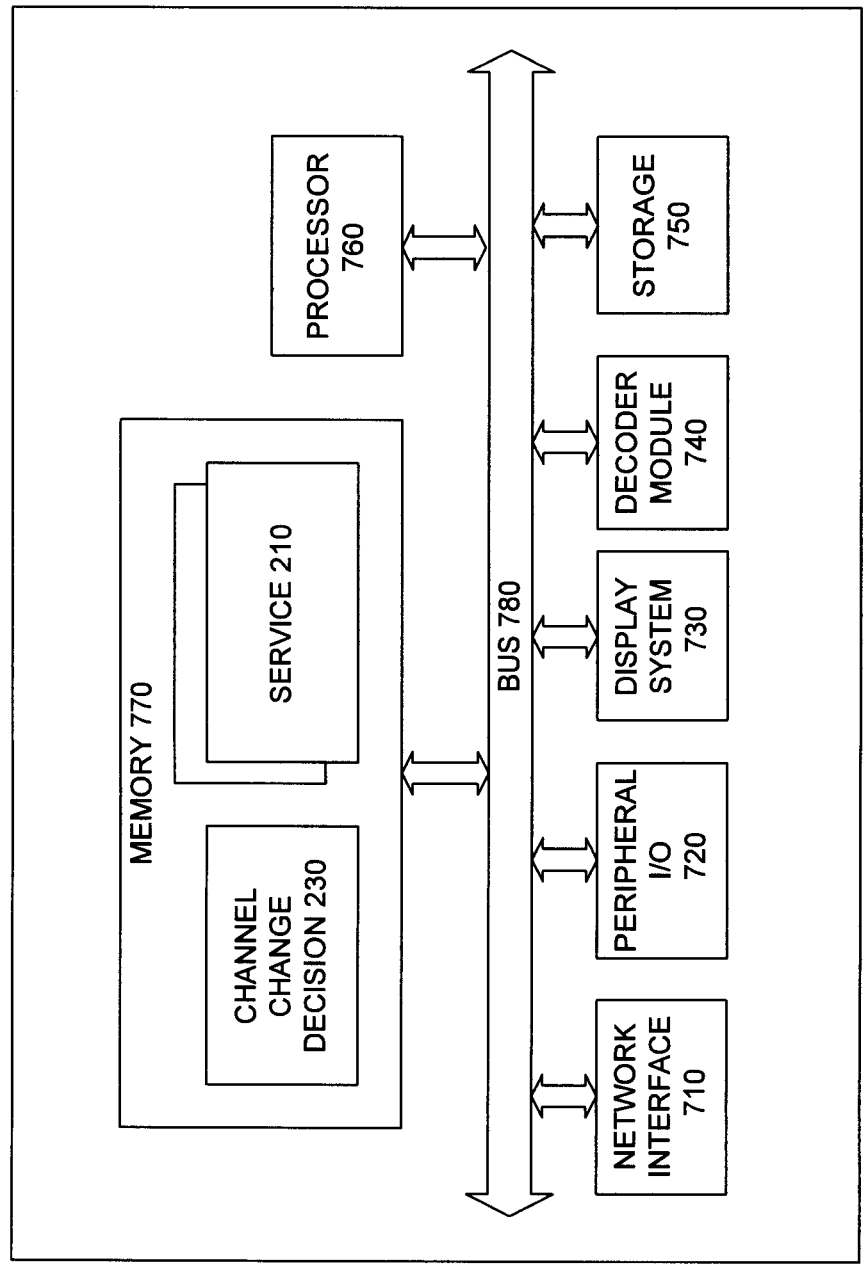
FIG. 7 is a block diagram showing selected components of the DHCT in FIG. 1.

FIG. 7 is a block diagram showing selected components of an exemplary DHCT 180 which implements systems and methods of differentiated requests for network access disclosed herein. DHCT 180 comprises: a network interface 710; a peripheral I/O interface 720; a display system 730; a decoder module 740; a storage device 750. a processor 760; and memory 770. These components are coupled by a bus 780. Omitted from FIG. 7 are a number of conventional components, known to those skilled in the art, that are unnecessary to explain the operation of the systems and methods of differentiated requests for network access disclosed herein.

Network interface 710 receives a stream of packets over subscriber connection 165, delivered through core network 140 (FIG. 1). In some embodiments, subscriber connection 165 is implemented by HFC. In these embodiments, DHCT 180 includes a tuner/demodulator (not shown) which processes the digital signals received from the head-end over the HFC connection. Decoder module 740 decodes the incoming stream into a stream of decoded video frames. In some embodiments, decoder module 740 also removes frames from packets, and demultiplexes of multiple streams (e.g., audio and video). In some embodiments, decoder module 740 also decrypts the MPEG stream. Display system 730 converts the decoded video frames into a video signal for display by a computer monitor or a television (not shown).

Residing in memory 770 are services 210 and channel change decision logic 230 (FIG. 2). Memory 770 contains instructions that are executed by processor 760 to control operations of DHCT 180. Peripheral I/O interface 720 provides input and output signals, for example, user inputs from a remote control or front panel buttons or a keyboard, and outputs such as LEDs or LCD on the front panel.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of handling requests for access to a downstream network connected to a digital home communication terminal (DHCT), the method comprising:
    receiving a request at the DHCT for access to a downstream network connected to the DHCT;
    determining whether the request for access is a user request;
    creating, in response to the request for access not being the user request, a request id for the request for access, the request id comprising a fastmode flag and a delay flag, wherein creating the request id comprises setting: the fastmode flag to false, and wherein the fastmode flag controls whether fast channel change is utilized;
    in response to the request of access not being the user request, determining whether the request for access is a DVR request;
    setting, in response to the request for access being the DVR request, the delay flag in the request id to random, wherein the delay flag controls the amount of delay between the request to channel acquisition and the actual channel change; and
    performing a channel change based on the request id;
    wherein performing the channel change, in response to the request for access being the DVR request, further comprising:
        determining a first resolution based on an available amount of DVR memory storage space,
        determining a second resolution based on an available bandwidth,
        determining a desired resolution to be a minimum of the first resolution and the second resolution,
        determining a requested resolution based on a requested channel's resolution, wherein determining the requested resolution comprises comparing the desired resolution to the request channel's resolution, and
        attempting to find an analogous channel when the desired resolution is different than the requested resolution, wherein attempting to find an analogous channel comprises selecting an appropriate server from multiple servers, the appropriate server being configured to deliver the desired resolution.

2. The method of claim 1, further comprising:
    determining whether the request for access involves background data collection; and
    setting a network access priority to a first value based on the result of determining whether the request for access involves background data collection.

3. The method of claim 2, further comprising: setting the network access priority to low when the request for access involves background data collection.

4. The method of claim 2, further comprising: setting the network access priority to intermediate when the request for access does not involve background data collection.

5. The method of claim 1 further comprising:
    determining whether the request for access involves background data collection; and
    setting a network access priority to a first value, the first value based on the result of determining whether the request for access involves background data collection, and on the source of the request for access.

6. The method of claim 5, further comprising: setting the network access priority to intermediate when the request for access does not involve background data collection and the source of the request is a navigator component.

7. The method of claim 5, further comprising: setting the network access priority to intermediate when the request for access does not involve background data collection and the source of the request is other than a navigator component.

8. A digital home communication terminal (DHCT) comprising:
    memory having stored thereon program code; and
    a processor that is programmed by at least the program code to enable the DHCT to:
        receive a request for access to a downstream network connected to the DHCT;
        determine whether the request for access is a user request;
        create, in response to the request for access not being the user request, a request id for the request for access, the request id comprising a fastmode flag and a delay flag, wherein creating the request id comprises setting the fastmode flag to false, and wherein the fastmode flag controls whether fast channel change is utilized,
        in response to the request of access not being the user request,
    determine, whether the request is a DVR request;
        set, in response to the request for access being the DVR request, the delay flag in the request id to random, wherein the delay flag controls the amount of delay between the request to channel acquisition and the actual channel change, and
    perform a channel change based on the request id;
    wherein performing the channel change, in response to the request for access being the DVR request, comprises:
        determine a first resolution based on an available amount of DVR memory storage space,
        determine a second resolution based on an available bandwidth,
        determine a desired resolution to be a minimum of the first resolution and the second resolution,
        determine a requested resolution based on a requested channel's resolution, wherein determining the requested resolution comprises comparing the desired resolution to the request channel's resolution, and attempt to find an analogous channel when the desired resolution is different than the requested resolution, wherein attempting to find an analogous channel comprises selecting an appropriate server from multiple servers, the appropriate server being configured to deliver the desired resolution.

9. The system of claim 8, wherein the processor is further programmed to enable the DHCT to: determine whether the request for access involves background data collection; and set a network access priority to a first value based on the result of determining whether the request for access involves background data collection.

10. The system of claim 9, wherein the processor is further programmed to enable the DHCT to: set the network access priority to low when the request for access involves background data collection.

11. The system of claim 9, wherein the processor is further programmed to enable the DHCT to: set the network access priority to intermediate when the request for access does not involve background data collection.

12. The system of claim 8, wherein the processor is further programmed to enable the DHCT to:
 determine whether the request for access involves background data collection; and
 set a network access priority to a first value, the first value based on the result of determining whether the request for access involves background data collection, and on the source of the request for access.

13. The system of claim 12, wherein the processor is further programmed to enable the DHCT to: set the network access priority to intermediate when the request for access does not involve background data collection and the source of the request is a navigator component.

14. The system of claim 12, wherein the processor is further programmed to enable the DHCT to: set the network access priority to intermediate when the request for access does not involve background data collection and the source of the request is other than a navigator component.

15. A non-transitory computer-readable medium having instructions that when executed causing a processor to:
 receive a request for access to a downstream network connected to the DHCT;
 determine, whether the request for access is a user request;
 create, in response to the request for access not being the user request, a request id for the request for access, the request id comprising a fastmode flag and a delay flag, wherein creating the request id comprises setting the fastmode flag to false, and wherein the fastmode flag controls whether fast channel change is utilized,
 in response to the request of access not being the user request, determine, whether a source of the request as is a DVR request;
 set, in response to the source for request being the DVR request, the delay flag in the request id to random, wherein the delay flag controls the amount of delay between the request to channel acquisition and the actual channel change; and
 perform a channel change based on the request id;
 wherein performing the channel change, in response to the request for access being the DVR request, comprises:
  determining a first resolution based on an available amount of DVR memory storage space,
  determining a second resolution based on an available bandwidth,
  determining a desired resolution to be a minimum of the first resolution and the second resolution,
  determining a requested resolution based on a requested channel's resolution, wherein determining the requested resolution comprises comparing the desired resolution to the request channel's resolution, and
  attempting to find an analogous channel when the desired resolution is different than the requested resolution, wherein attempting to find an analogous channel comprises selecting an appropriate server from multiple servers, the appropriate server being configured to deliver the desired resolution.

16. The computer-readable medium of claim 15, further comprising:
 determine whether the request for access involves background data collection; and
 set a network access priority to a first value based on the result of determining whether the request for access involves background data collection.

17. The computer-readable medium of claim 15, further comprising:
 determine whether the request for access involves background data collection; and
 set a network access priority to a first value, the first value based on the result of determining whether the request for access involves background data collection, and on the source of the request for access.

18. The method of claim 5, wherein the background collection includes activities that do not require immediate display of requested data to a user.

19. The method of claim 1, wherein performing the channel change further comprises controlling a delay time between receiving the request at the DHCT for access to the downstream network and performing the channel change.

20. The method of claim 2, when the request for access involves background data collection, further comprising:
 setting a priority flag to the lowest;
 determining a reason for the background services as one of: an user and not the user, and
 when the reason for the background services is not the user: setting the delay flag to random long.

* * * * *